Jan. 23, 1951 S. J. BURNS 2,539,058
CUSHION CONSTRUCTION
Filed Sept. 16, 1947 2 Sheets—Sheet 2
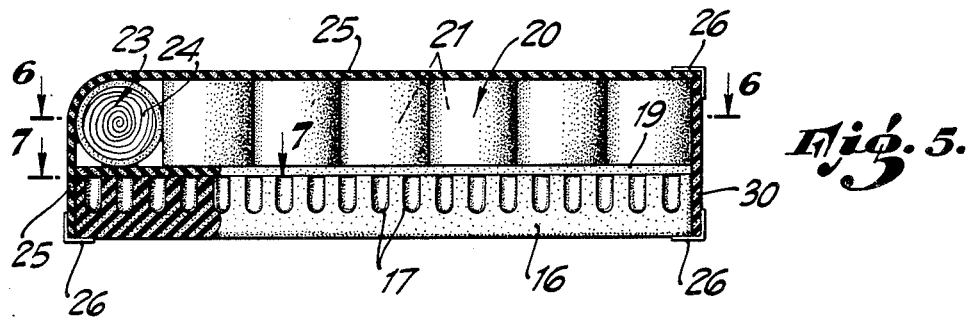
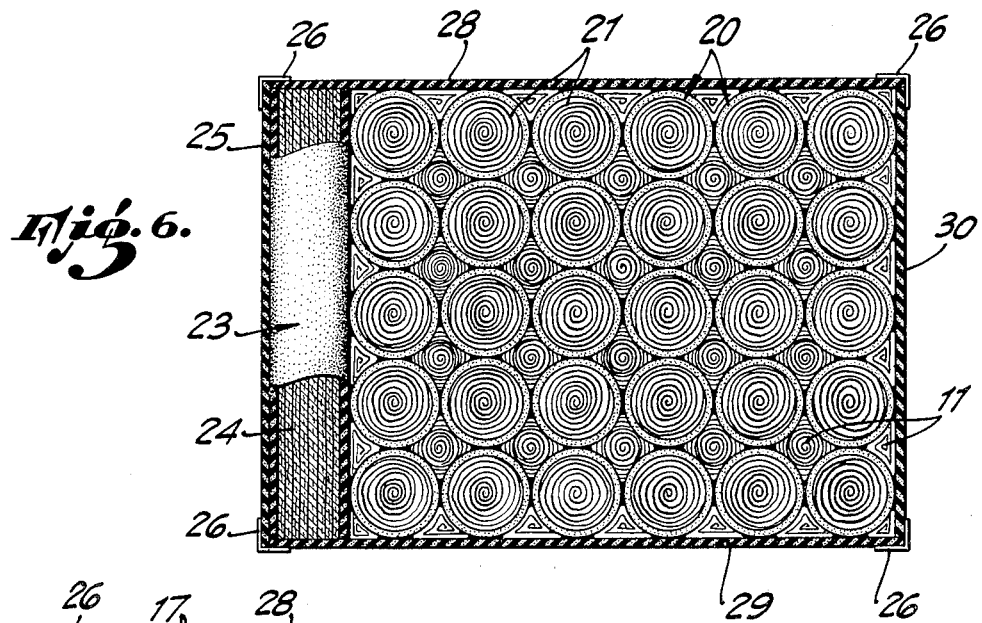
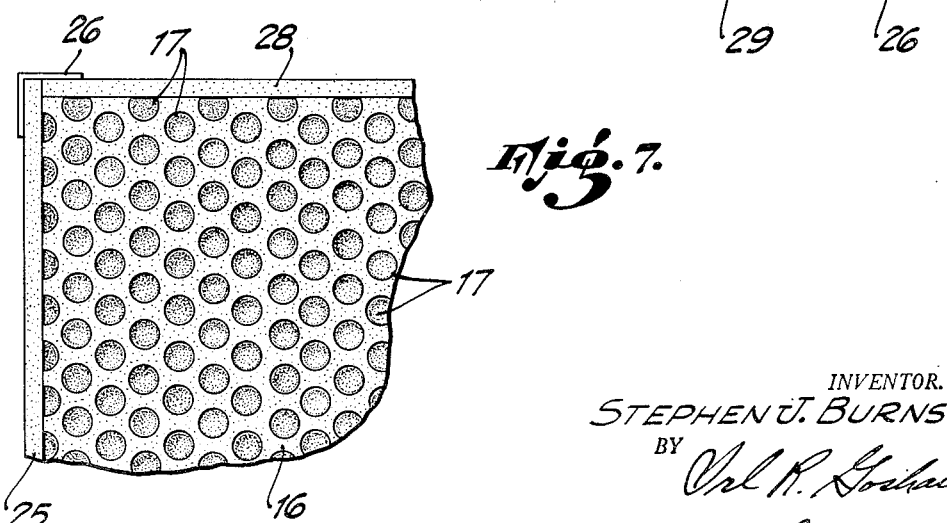
INVENTOR.
STEPHEN J. BURNS,
BY
ATTORNEY.

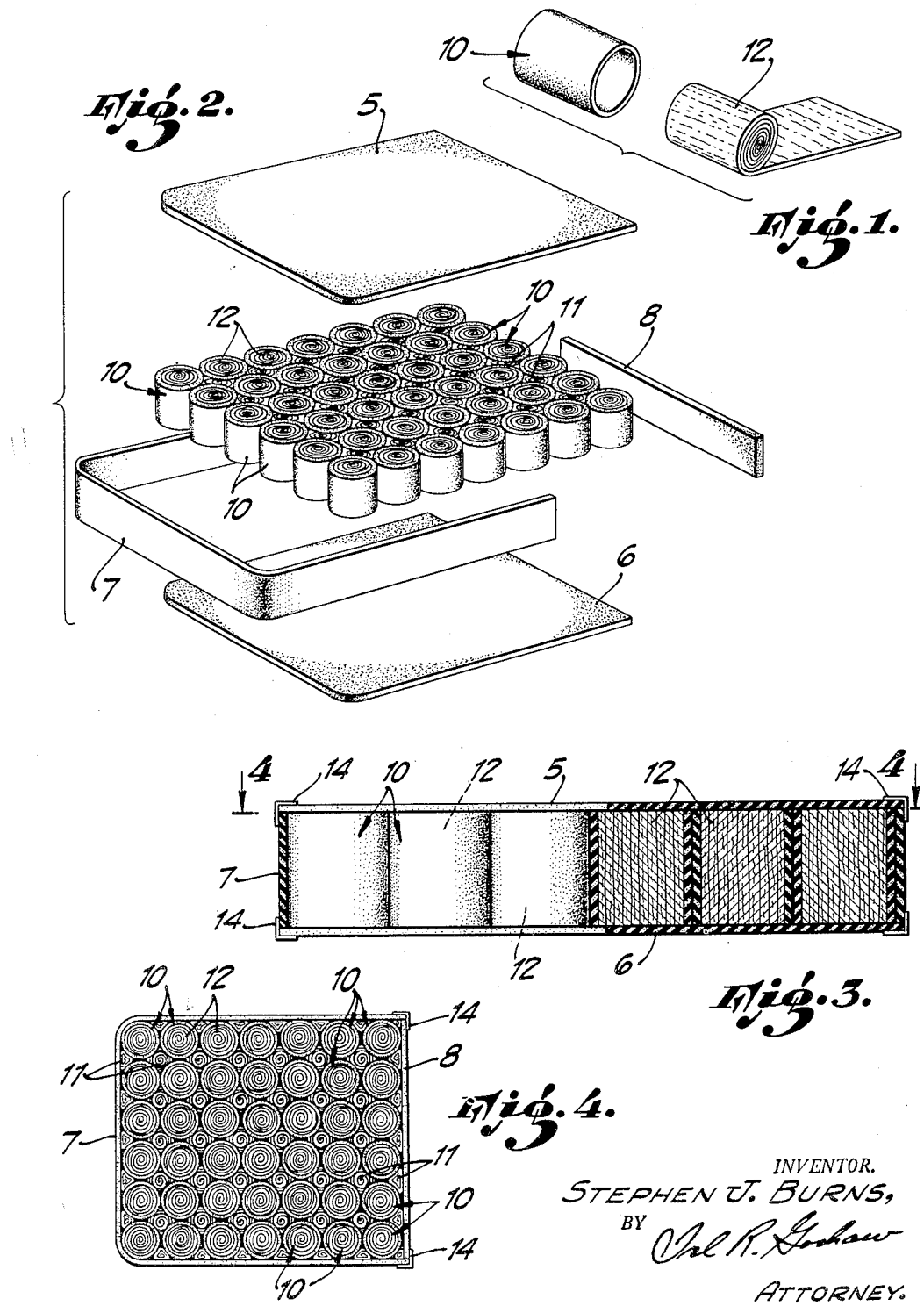

Patented Jan. 23, 1951

2,539,058

UNITED STATES PATENT OFFICE 2,539,058

CUSHION CONSTRUCTION

Stephen J. Burns, Burbank, Calif.

Application September 16, 1947, Serial No. 774,375

14 Claims. (Cl. 155—178)

This invention relates to fabricated cushions, mattresses, pads, and the like, and particularly to types of fabricated cushions, mattresses, and pads which are light in weight, flame-proof, buoyant, and especially resilient and suitable for use in aircraft and boats.

The use of rubber for cushions and mattresses is well-known, the present invention, however, being directed to a combination of air foam rubber and fiber glass, the air foam rubber providing the shell to shape the cushion or mattress and also the cellular structure to aid in determining the resiliency over predetermined areas. The fiber glass is used within the cells to control the resiliency by increasing or decreasing from normal the size or density of the rings or coils of fiber glass within the cells. That is, the fiber glass is in the form of rolls and the tightness of the rolls within each cell permits the resiliency to be distributed as desired. Also, variations in size of the individual cells will control the density and resiliency of the cushion. The fiber glass is fire-proof, very buoyant, has no "jelly" action, and provides the maximum in vibration insulation between a vibrating seat or bed frame and the body of a person in a similar manner to the property of fiber glass to absorb sound waves. This makes the structure particularly desirable for use in aircraft, trains, and the like.

The air foam rubber and fiber glass are so combined as to provide a pad in either cushion or mattress form which has the maximum of resiliency per pound of weight, which is particularly soft and body fitting while being flame-proof (foam-rubber will not burst into flame, but only melt, while fiber glass is fire-proof), which is sag-proof, and which is particularly buoyant so as to serve as a life preserver in water. Its light weight and extreme resiliency make it particularly desirable in aircraft where weight is important.

The principal object of the invention, therefore, is to provide an improved cushion, pad, or mattress construction.

Another object of the invention is to provide a combination air foam rubber and fiber glass cushion or pad.

A further object of the invention is to provide a cushion of light weight, and one which is flame-proof, buoyant, and in which the degree of resiliency may be controlled during construction.

A still further object of the invention is to provide a cushion or pad having a frame of air foam rubber and a filler of fiber glass.

A still further object of the invention is to provide a cellular structure of air foam rubber in which the cells are filled with rolls of fiber glass of varying tightness to control the resiliency of the structure over predetermined areas.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Fig. 1 shows perspective views of the cell and the filler therefor partially rolled.

Fig. 2 is an exploded view of the shell or frame and cells of air foam rubber and the fillers of fiber glass.

Fig. 3 is a cross-sectional view of a completed cushion, pad, or mattress, embodying the invention.

Fig. 4 is a cross-sectional view taken along the line 4—4 of Fig. 3.

Fig. 5 is a cross-sectional view of a modification of the invention.

Fig. 6 is a cross-sectional view taken along the line 6—6 of Fig. 5, and

Fig. 7 is a cross-sectional view of the modification shown in Fig. 5 and taken along the line 7—7 of Fig. 5.

Referring now to the drawings, in which the same numerals refer to like elements, a shell or form is provided of air foam rubber, the top and bottom sheets 5 and 6, respectively, being cut to the desired size, although the cushion shown in Figs. 1–4, inclusive, is reversible. These sheets may be of air foam rubber about one-fourth inch thick. This thickness of rubber is also preferred for the walls and cells of the average cushion, the thickness of the sheets being increased for larger units. The outer wall 7 is then cut to the desired height, this element forming three sides, the fourth side being a wall 8 which is cemented to the ends of wall 7. These wall sections may be of different lengths, a preferred arrangement being shown. The edges of the wall sections are then cemented to the outer edge surface of the sheet 6.

The next units are the cylindrical cells 10 formed by cutting air foam rubber into strips of the same width as the height of the walls 7 and 8 and cementing the ends together. These cells are then stacked or arranged within the walls and the bottom edges of the cells cemented to the sheet 6 and each cell to each other, where they contact, and to the walls 7 and 8 where the outer cells contact the walls.

The next step in the construction is to fill the cells with coils of fiber glass. The fiber glass coils are made by cutting a sheet of fiber glass into strips which are rolled into coils 12, the tightness of the coils determining the density of the cushion. (See Fig. 1.) The width of the fiber glass strips or height of the coils is the same as the height of the cells 10, it being preferable to cement the ends of the coils to the sheet 6. The spaces between the cells 10 are filled with smaller rolls 11 of fiber glass. The fiber glass may be Owens-Corning Y-13, or a similar quality fibrous product. Since the fiber glass, as it comes off the conveyor at the manufacturers, has seventy-five percent of the fibers lying in one direction, these rolls are cut so that the majority of the fibers will be on end when inserted in the cells, or at right angles to the base sheet 6. This arrangement provides maximum resiliency. Although the spaces between the cells 10 are shown filled only with fiber glass rolls 11, small cells in which these rolls are inserted may be used in the spaces, although the small cells are not necessary.

The entire upper sheet 5 is then covered with cement and placed over the walls 7 and 8, cells 10, and coils 12. By securing each fiber glass coil or roll in this manner, additional help is given the roll to return to its normal shape by the tendency of the air foam rubber to return to its normal shape. By cementing the ends of the rolls, improved water-repellent qualities are given to the cushion. To further increase these qualities and to increase the seam strength, waterproof adhesive tape 14 is secured at all seams.

For concentrated densities, such as bottom seat cushions, an additional base sheet of cored air foam rubber 16 (see Figs. 5, 6, and 7) having cores 17 is cemented to an air foam rubber sheet 19 which completely seals the cores 17. The air trapped in the cores prevents the cushion from having a bottoming effect, the cores extending somewhat over one-half its depth into the base sheet 16. The upper portion of the cushion is formed of cells 20 and fiber glass rolls 21, as in Figs. 1-4, inclusive, except that a "waterfall" is provided at the front edge of the cushion by a long ring 23 of air foam rubber filled with fiber glass 24. The upper sheet 25 now extends over ring 23 to the bottom of base 16, all contacting surfaces being cemented together. The seams are covered by water-proof tape 26, the sides of the cushion having walls such as shown at 28, 29, and 30. Although the fiber glass 24 is shown within an air foam cylinder 23, this unit may be solely of a roll of fiber glass. Furthermore, by using base sheets 16 of different densities, various degrees of "bottoming" effect may be obtained.

As foam rubber is porous, the air is not completely trapped, but escapes gradually and returns in the same manner. Since the fiber glass coils are more effective when in close contact with the body, any additional cushioning is placed under the coils 12 as shown in Figs. 1 to 4, inclusive, and under coils 21, as shown in Figs. 5-7, inclusive. The entire cushion may be sprayed with a water-proof material to aid its buoyancy, while a quilted envelope of fiber glass may be used for extreme fire prevention. The quilting is accomplished by sewing through and between the outer surfaces the same as quilting is done in cloth and cotton-filled materials for bedding.

Cushions, pads, and mattresses constructed as described above do not sag, since each fiber glass core is individually secured to the base and cover of the shell and is restored by the resiliency of its individual cell and that of the cover and adjoining cells. By varying the tightness or number of turns of the cores, or number of cells, a greater density may be obtained at certain regions of the cushions such as at the front edge and decreasing toward the rear. The extreme buoyancy of the construction enhances their use as life-saving cushions. Although the shape of the cells 10 and 20 has been illustrated as cylindrical, and this shape is preferred, other shapes may also be used, while the completed cushion or pad may have any desired shape.

I claim:

1. A cushion comprising a frame of bottom, top, and wall elements, a plurality of cellular units within said wall elements and having their ends attached to said bottom and top elements and their side contacting surfaces attached to each other and to said wall elements, and a plurality of fibrous coil elements rolled within said units with the majority of the fibers extending parallel with the axis of said units and attached to said bottom and top elements.

2. A cushion in accordance with claim 1, in which said bottom, top, and wall elements and said cellular units are of air foam rubber and said coil elements are of fiber glass with long fibers having the ends of the fibers contacting said bottom and top elements attached thereto.

3. A cushion in accordance with claim 1, in which said cushion is provided with a base element of cored air foam rubber, said cores extending partially through said base element, said bottom being cemented over the surface of said base having said cores to air seal said cores.

4. A cushion in accordance with claim 1, in which a longitudinal coil is provided across one edge of said cushion.

5. A cushion construction comprising a frame having a side wall and top and bottom elements, a plurality of hollow, cylindrical tubes within said frame and attached to said wall, top and bottom elements, and to each other at points of contact, and rolled fiber fillers in said tubes and in the interstices between said tubes and said wall, top, and bottom elements, substantially seventy-five percent of the fibers in said fillers being perpendicular to said top and bottom elements.

6. A cushion construction in accordance with claim 5, in which a base element is provided to which said bottom element is attached.

7. A cushion construction, comprising a frame having a side wall and top and bottom elements, a plurality of cellular units within said frame and attached to said wall, top, and bottom elements, and to each other at points of contact, and rolled fiber fillers in said units and in the interstices between said units and said wall, top, and bottom elements, said wall, top, and bottom elements being of air foam rubber and said fiber fillers being fiber glass having the majority of the long fibers extending parallel with the axis of said cellular units.

8. A cushion construction in accordance with claim 7, in which said wall, top, and base elements are covered with a water-proof material.

9. A cushion construction comprising a bottom element, a plurality of cellular units having their ends attached to said bottom elements and their sides attached to each other at points of contact, rolled fiber material within said units and in the interstices between said units and having the majority of the fibers thereof extending perpendicularly to the inner surface of said bottom element, a wall having its edge attached to the edge of said bottom element, and a top element having its edge attached to the other edge of said wall and to the other ends of said cellular units.

10. A cushion construction in accordance with claim 9, in which said cellular units are cylindrical and of sponge rubber and said rolled fiber material is fiber glass, said rolls being of varying numbers of turns to vary the density over different portions of said cushion.

11. A cushion construction of substantially rectangular shape comprising a wall having a width of substantially the thickness of said cushion, a flat bottom element attached to one of the edges of said wall, a plurality of hollow cylindrical cells stacked side by side within the boundaries of said wall and having one end of each cell attached to said bottom element, a plurality of rolls, one each of which is within one of said cells, said rolls having their ends attached to said bottom element, and a top element similar to said bottom element and which is attached to the other edge of said wall and to the other ends of said cells and rolls, said wall, top and bottom elements, and said cells being of air foam rubber and said rolls being of fiber glass of different numbers of turns to vary the density of said cushion over different areas and having the majority of the fibers extended perpendicularly to the top and bottom elements.

12. A cushion construction of substantially rectangular shape, comprising a wall having a width of substantially the thickness of said cushion and extending along three sides of said cushion, a flat, bottom element, a plurality of hollow cylindrical cells stacked side by side within the boundaries of said wall and having one end of each cell attached to said bottom element, a plurality of rolls, one each of which is within one of said cells, said rolls having their ends attached to said bottom element, a top element attached to the other edge of said wall and to the other ends of said cells and rolls, a cored air foam base attached to the underside of said bottom element and a fiber glass roller extending longitudinally between two sides of said wall and between said bottom and top elements, said top element extending over said roller and to the bottom of said base.

13. A cushion construction in accordance with claim 12, in which said rolls are of fiber glass having the major portion of the long fibers parallel with the longitudinal axis of said cells.

14. A cushion comprising a top element, a bottom element, said top and bottom elements being parallel to one another and of air foam rubber, a plurality of cells between the top and bottom surfaces of said elements, the axes of said cells being perpendicular to the surfaces of said top and bottom elements, and a fiber glass roll in each of said cells having the majority of the individual fibers thereof perpendicular to the top and bottom surfaces of said elements.

STEPHEN J. BURNS.

REFERENCES CITED

The following references are of record in the file of this patent:

UNITED STATES PATENTS

| Number | Name | Date |
|---|---|---|
| 139,202 | Smith | May 20, 1873 |
| 698,529 | Marshall | Apr. 29, 1902 |
| 880,784 | Ferres | Mar. 3, 1908 |
| 1,192,510 | Fischman | July 25, 1916 |
| 1,296,359 | Brown | Mar. 4, 1919 |
| 1,579,074 | Burton | Mar. 30, 1926 |
| 1,980,445 | Sherover | Nov. 13, 1934 |
| 2,271,842 | Nachman | Feb. 3, 1942 |

FOREIGN PATENTS

| Number | Country | Date |
|---|---|---|
| 482,809 | Great Britain | Apr. 4, 1938 |
| 747,776 | France | Apr. 4, 1933 |